(12) United States Patent
Xiao et al.

(10) Patent No.: US 12,304,381 B2
(45) Date of Patent: May 20, 2025

(54) OBJECT TRACKING ADAPTIVE DRIVING BEAM

(71) Applicant: Rivian IP Holdings, LLC, Plymouth, MI (US)

(72) Inventors: Yifu Xiao, Costa Mesa, CA (US); Luis Guillermo Sagastume Pelaez, Fountain Valley, CA (US); Vijay Jayaraman, Irvine, CA (US); Simon Baker, Hampshire (GB); Shammika Ashan Wickramasinghe, Oxfordshire (GB)

(73) Assignee: Rivian IP Holdings, LLC, Irvine, CA (US)

( * ) Notice: Subject to any disclaimer, the term of this patent is extended or adjusted under 35 U.S.C. 154(b) by 144 days.

(21) Appl. No.: 18/103,332

(22) Filed: Jan. 30, 2023

(65) Prior Publication Data

US 2024/0217427 A1   Jul. 4, 2024

Related U.S. Application Data

(60) Provisional application No. 63/436,072, filed on Dec. 29, 2022.

(51) Int. Cl.
*B60Q 1/00* (2006.01)
*B60Q 1/14* (2006.01)

(52) U.S. Cl.
CPC ........... *B60Q 1/143* (2013.01); *B60Q 1/0035* (2013.01); *B60Q 2300/314* (2013.01)

(58) Field of Classification Search
CPC ...... H05B 45/10; H05B 47/10; H05B 47/105; H05B 47/125; B60Q 1/143; B60Q 1/0035; B60Q 2300/314
See application file for complete search history.

(56) References Cited

U.S. PATENT DOCUMENTS

| | | | |
|---|---|---|---|
| 2012/0194356 A1* | 8/2012 | Haines | G08G 1/161 340/933 |
| 2019/0054852 A1 | 2/2019 | Wickramasinghe et al. | |

* cited by examiner

*Primary Examiner* — Jimmy T Vu
(74) *Attorney, Agent, or Firm* — Patterson + Sheridan, LLP

(57) ABSTRACT

Particular embodiments may provide a control system for a vehicle, which may include and memory coupled to the processors. The memory may include instructions executable by the processor. The processors may be operable when executing the instructions to receive signals from a mobile device which may be associated with a user and may also be wirelessly connected to the vehicle. The signals may be received by sensors of the vehicle. The processors may be further operable when executing instructions to identify a lighting mode for illuminating an area associated with a device location. The processors may be further operable when executing instructions to determine illumination fields and lighting properties based on the lighting mode and the device location. The processors may be further operable when executing instructions to control operation of lights of the vehicle in accordance with the illumination fields and the lighting properties.

20 Claims, 10 Drawing Sheets

OBJECT TRACKING ADAPTIVE DRIVING BEAM

CROSS-REFERENCE TO RELATED APPLICATION

This application is a non-provisional application under 35 U.S.C. § 119(e) of U.S. Provisional Application No. 63/436,072, filed Dec. 29, 2022, the entire contents of which are hereby incorporated by reference in their entirety.

INTRODUCTION

Generally, vehicles have headlights that a user may be able to activate or deactivate in whole and not in part. It may be desirable for a user to selectively activate or deactivate portions of the headlights to provide a particular illumination pattern.

BRIEF SUMMARY

Provided herein is a system for configuring illumination associated with a vehicle which may improve visibility of an environment to a user by selectively illuminating specified areas with a specified brightness and color temperature. In some embodiments, a control system for a vehicle may include one or more processors and a memory coupled to the processors. The memory may include instructions executable by the processor. The processors may be operable when executing instructions to receive signals from a mobile device. The mobile device may be associated with a user. The mobile device may also be wirelessly connected to the vehicle. The processor may be further operable when executing instructions to identify a lighting mode for illuminating an area. The area may be associated with a device location. The processor may be further operable when executing instructions to determine illumination fields and lighting properties. The determination may be based on the lighting mode and the device location. The processor may be further operable when executing instructions to control operation of one or more lights of the vehicle. The control may be in accordance with the illumination fields and the lighting properties.

In some embodiments, the lighting mode may include an environment mode, a beam pattern mode, or a manual mode. The beam pattern mode may include a spotlight mode, a work mode, or a directional mode.

In some embodiments, the processors may be operable when executing instructions to determine illumination fields and lighting properties. The determination of the illumination fields and the lighting properties may be further based on the environment mode. The processors may be further operable when executing instructions to capture an image of an area proximate to the vehicle. The image may be captured by an image sensor of the vehicle. The processor may be further operable when executing instructions to identify an environment. The environment may be identified based on the image. The processor may be further operable when executing instructions to determine the illumination fields and the lighting properties. The illumination fields and the lighting properties may be based on the environment.

In some embodiments, the processors may be operable when executing instructions to determine illumination fields and lighting properties. The determination of the illumination fields and lighting properties may be further based on the beam pattern mode. The processors may be further operable when executing instructions to determine a location of the person. The determination of the location of the person may be based on the device location. The processor may be further operable when executing instructions to determine the illumination field as occupied. The determination that the illumination field is occupied may be based on the location of the person being within an illumination field of the illumination fields.

In some embodiments, the processors may be operable when executing instructions to determine illumination fields and lighting properties. The determination of the illumination fields and the lighting properties may be further based on the beam pattern mode. The processors may be further operable when executing instructions to determine the occupied illumination field as the illumination fields based on the beam pattern mode being in the spotlight mode. The processors may be further operable when executing instructions to determine the illumination fields adjacent to the occupied illumination field as the illumination field based on the beam pattern mode being in the work mode. The processors may be further operable when executing instructions to determine the occupied illumination field as the illumination field based on the beam pattern mode being in the directional mode.

In some embodiments, the processors may be further operable when executing instructions to determine the location of the mobile device. The determination of the location of the mobile device may be based on time intervals between signals captured by the sensor.

In some embodiments, processors may be further operable when executing instructions to receive signals from the mobile device. The signals may be received by a sensor of the vehicle. The processors may be further operable when executing instructions to determine the location of the mobile device. The determination of the location of the mobile device may based on information in the signals. The information may include geo-spatial positioning data.

In some embodiments, processors may be operable when executing instructions to determine illumination fields and lighting properties. The determination of the illumination fields and the lighting properties may be further based on a location of a person. The processors may be further operable when executing instructions to capture, an image of an area proximate to the vehicle. The image may be captured by an image sensor of the vehicle. The processors may be further operable when executing instructions to identify a person being within the image. The identification may be based on the image. The processors may be further operable when executing instructions to determine the location of the person. The determination of the location of the person may be based on the image.

In some embodiments, the processors may be operable when executing instructions to determine illumination fields and lighting properties. The determination of the illumination fields and the lighting properties may be further based on a direction the person is facing. When the person is facing the vehicle, the brightness of the lighting properties may decrease.

In some embodiments, the processors may be operable when executing instructions to determine illumination fields and lighting properties. The determination of the illumination fields and the lighting properties may be further based on the manual mode. The processors may be further operable when executing instructions to configure the manual mode. The processors may be further operable when executing instructions to receive user-input associated with the illumination fields and lighting properties.

In some embodiments, the processors may be operable when executing instructions to determine illumination fields and lighting properties. The determination of the illumination fields and lighting properties may be further based on user gestures captured by an image sensor of the vehicle.

In some embodiments, the processors may be further operable when executing instructions to determine a location of the vehicle. The processors may be further operable when executing instructions to identify a maximum allowed brightness associated with the lighting properties. The maximum allowed brightness may be based on the location of the vehicle. The processors may be further operable when executing instructions to limit a brightness associated with the lighting properties. The limit may be based on the maximum allowed brightness.

In some embodiments, the processors may be further operable when executing instructions to identify allowed color temperatures associated with the lighting properties. The allowed color temperatures may be based on the location of the vehicle. The processors may be further operable when executing instructions to limit a color temperature associated with the lighting properties. The limit may be based on the allowed color temperatures.

In some embodiments, the processors may be further operable when executing instructions to determine a color temperature associated with the lighting properties. The determination of the color temperature may be based on a time of day.

In some embodiments, the processors may be further operable when executing instructions to decrease the color temperature when a time at a location of the vehicle transitions from daytime to nighttime. The processors may be further operable when executing instructions to increase the color temperature when a time at a location of the vehicle transitions from nighttime to daytime.

In some embodiments, the processors may be operable when executing instructions to determine the color temperature. The determination of the color temperature may be further based on ambient lighting conditions captured by a sensor of the vehicle.

In some embodiments, the processors are further operable when executing instructions to receive, signals from a second mobile device. The mobile device may be associated with a second user. The mobile device may be wirelessly connected to the vehicle. The signals may be received by the one or more sensors. The processors may be further operable when executing instructions to modify the lighting mode based on a second area associated with a second device location. The processors may be further operable when executing instructions to determine illumination fields and lighting properties. The determination of the illumination fields and lighting properties may be based on the lighting mode and the second device location.

In some embodiments, the processors may be operable when executing instructions to display an image, a video, or an interactive game. The display may be performed by the one or more lights.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
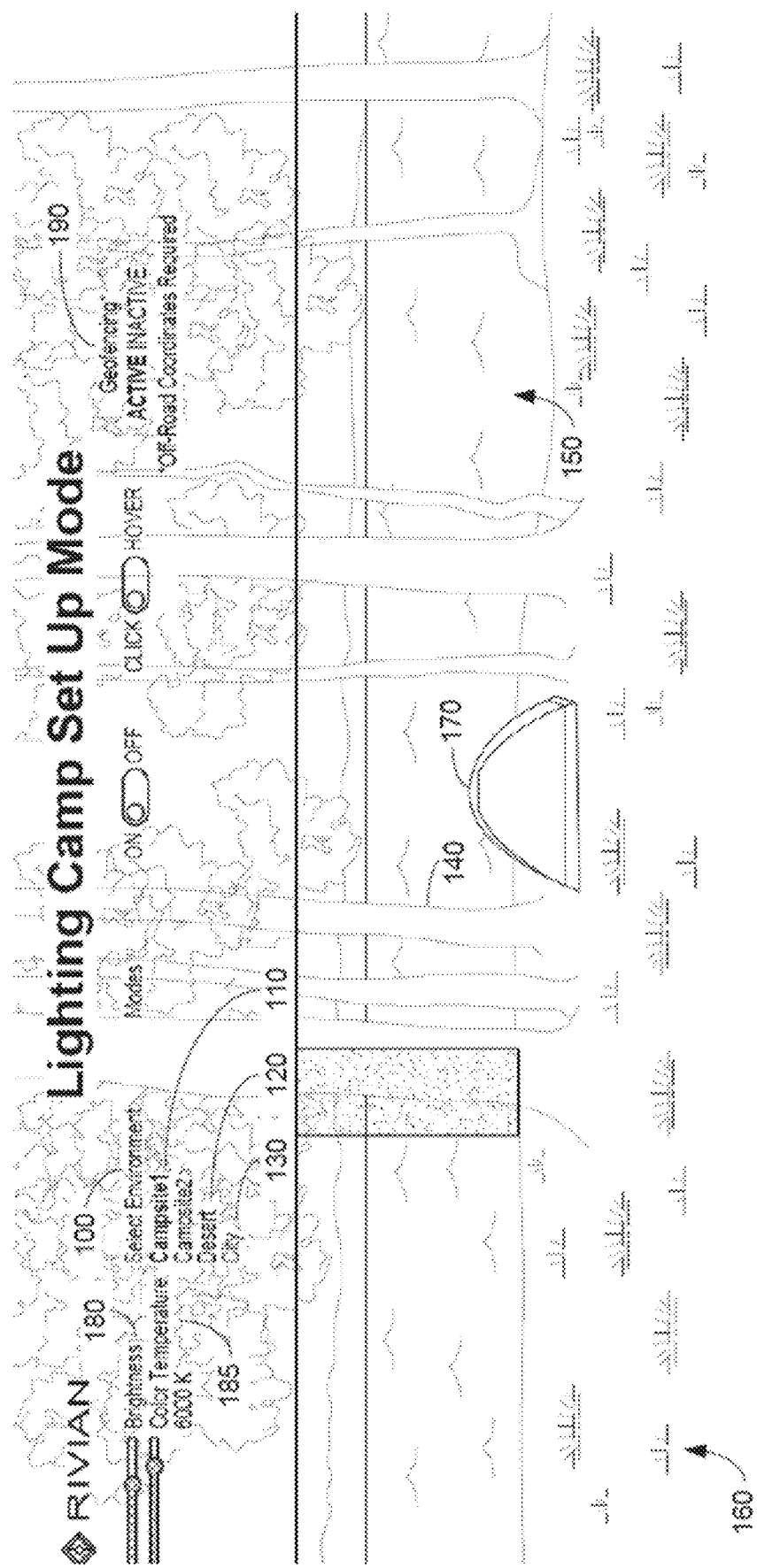
FIG. 1 illustrates an example user interface for configuring settings of a vehicle related to an environment mode.

Provided herein is a system for configuring illumination associated with a vehicle which may improve visibility of an environment to a user by selectively illuminating specified areas with a specified brightness and color temperature. In some embodiments, a control system for vehicle may include one or more processors and a memory coupled to the processors. The memory may include instructions executable by the processor. The processors may be operable when executing instructions to receive signals from a mobile device. The mobile device may be associated with a user. The mobile device may also be wirelessly connected to the vehicle. The processor may be further operable when executing instructions to identify a lighting mode for illuminating an area. The area may be associated with a device location. The processor may be further operable when executing instructions to determine illumination fields and lighting properties. The determination may be based on the lighting mode and the device location. The processor may be further operable when executing instructions to control operation of one or more lights of the vehicle. The control may be in accordance with the illumination fields and the lighting properties.

In some embodiments, the lighting mode may include an environment mode, a beam pattern mode, or a manual mode. The beam pattern mode may include a spotlight mode, a work mode, or a directional mode.

In some embodiments, the processors may be operable when executing instructions to determine illumination fields and lighting properties. The determination of the illumination fields and the lighting properties may be further based on the environment mode. The processors may be further operable when executing instructions to capture an image of an area proximate to the vehicle. The image may be captured by an image sensor of the vehicle. The processor may be further operable when executing instructions to identify an environment. The environment may be identified based on the image. The processor may be further operable when executing instructions to determine the illumination fields and the lighting properties. The illumination fields and the lighting properties may be based on the environment.

In some embodiments, the processors may be operable when executing instructions to determine illumination fields and lighting properties. The determination of the illumination fields and lighting properties may be further based on the beam pattern mode. The processors may be further operable when executing instructions to determine a location of the person. The determination of the location of the person may be based on the device location. The processor may be further operable when executing instructions to determine the illumination field as occupied. The determination that the illumination field is occupied may be based on the location of the person being within an illumination field of the illumination fields.

In some embodiments, the processors may be operable when executing instructions to determine illumination fields and lighting properties. The determination of the illumination fields and the lighting properties may be further based on the beam pattern mode. The processors may be further operable when executing instructions to determine the occupied illumination field as the illumination fields based on the beam pattern mode being in the spotlight mode. The processors may be further operable when executing instructions to determine the illumination fields adjacent to the occupied illumination field as the illumination field based on the beam pattern mode being in the work mode. The processors may be further operable when executing instructions to determine the occupied illumination field as the illumination field based on the beam pattern mode being in the directional mode.

In some embodiments, the processors may be further operable when executing instructions to determine the location of the mobile device. The determination of the location of the mobile device may be based on time intervals between signals captured by the sensor.

In some embodiments, processors may be further operable when executing instructions to receive signals from the mobile device. The signals may be received by a sensor of the vehicle. The processors may be further operable when executing instructions to determine the location of the mobile device. The determination of the location of the mobile device may based on information in the signals. The information may include geo-spatial positioning data.

In some embodiments, processors may be operable when executing instructions to determine illumination fields and lighting properties. The determination of the illumination fields and the lighting properties may be further based on a location of a person. The processors may be further operable when executing instructions to capture, an image of an area proximate to the vehicle. The image may be captured by an image sensor of the vehicle. The processors may be further operable when executing instructions to identify a person being within the image. The identification may be based on the image. The processors may be further operable when executing instructions to determine the location of the person. The determination of the location of the person may be based on the image.

In some embodiments, the processors may be operable when executing instructions to determine illumination fields and lighting properties. The determination of the illumination fields and the lighting properties may be further based on a direction the person is facing. When the person is facing the vehicle, the brightness of the lighting properties may decrease.

In some embodiments, the processors may be operable when executing instructions to determine illumination fields and lighting properties. The determination of the illumination fields and the lighting properties may be further based on the manual mode. The processors may be further operable when executing instructions to configure the manual mode. The processors may be further operable when executing instructions to receive user-input associated with the illumination fields and lighting properties.

In some embodiments, the processors may be operable when executing instructions to determine illumination fields and lighting properties. The determination of the illumination fields and lighting properties may be further based on user gestures captured by an image sensor of the vehicle.

In some embodiments, the processors may be further operable when executing instructions to determine a location of the vehicle. The processors may be further operable when executing instructions to identify a maximum allowed brightness associated with the lighting properties. The maximum allowed brightness may be based on the location of the vehicle. The processors may be further operable when executing instructions to limit a brightness associated with the lighting properties. The limit may be based on the maximum allowed brightness.

In some embodiments, the processors may be further operable when executing instructions to identify allowed color temperatures associated with the lighting properties. The allowed color temperatures may be based on the location of the vehicle. The processors may be further operable when executing instructions to limit a color temperature associated with the lighting properties. The limit may be based on the allowed color temperatures.

In some embodiments, the processors may be further operable when executing instructions to determine a color temperature associated with the lighting properties. The determination of the color temperature may be based on a time of day.

In some embodiments, the processors may be further operable when executing instructions to decrease the color temperature when a time at a location of the vehicle transitions from daytime to nighttime. The processors may be further operable when executing instructions to increase the color temperature when a time at a location of the vehicle transitions from nighttime to daytime.

In some embodiments, the processors may be operable when executing instructions to determine the color temperature. The determination of the color temperature may be further based on ambient lighting conditions captured by a sensor of the vehicle.

In some embodiments, the processors are further operable when executing instructions to receive, signals from a second mobile device. The mobile device may be associated with a second user. The mobile device may be wirelessly connected to the vehicle. The signals may be received by the one or more sensors. The processors may be further operable when executing instructions to modify the lighting mode based on a second area associated with a second device location. The processors may be further operable when executing instructions to determine illumination fields and lighting properties. The determination of the illumination fields and lighting properties may be based on the lighting mode and the second device location.

In some embodiments, the processors may be operable when executing instructions to display an image, a video, or an interactive game. The display may be performed by the one or more lights.

FIG. 1 illustrates an example user interface for configuring settings of a vehicle related to an environment mode. In some embodiments, configuring settings of a vehicle may include a control system for a vehicle. The control system may include one or more processors. The control system may also include a memory. The memory may be coupled to the processors. The memory may include instructions. The processor may be operable when executing the instructions.

In some embodiments, the processor may be operable when executing instructions to determine illumination fields and lighting properties. The determination of the illumination fields and the lighting properties may be based on the lighting mode and the device location. The lighting mode may, in some embodiments, include environment mode 100. The determination of the illumination fields and the lighting properties may also be based on environment mode 100. Environment mode 100 may include campsite mode 110, desert mode 120, or city mode 130. Environment mode 100 may be automatically selected, or may be user selected.

In some embodiments, the processors may be further operable when executing instructions to capture an image proximate to the vehicle. The image may be captured by a sensor of the vehicle. The sensor may include an image sensor or a distance sensor.

In some embodiments, the processor may be further operable when executing instructions to identify an environment. The environment may be based on the image. The processor may execute instructions to identify a feature in the image. Such feature may include a natural feature, such as tree 140, a rock, water 150 (e.g., a river, a stream, a pond, a lake, a marsh, or a waterfall), or grass 160. Features may also include a man-made feature, such as tent 170, a road (e.g., pavement, asphalt road, or a dirt road), or a building (e.g., a house, a skyscraper, or a warehouse). Based on the identified features, an environment may be identified. For example, an image that contains trees 130 with grass 150 and tent 160 may be identified as campsite 100. In another example, an images that contains multiple skyscrapers and multiple asphalt roads may be identified as city 120.

In some embodiments, geo-spatial positioning information ("positioning information") (e.g., GPS, GLONASS, or GALILEO) may also be captured by the sensor. The positioning information may be captured at the same time as the image, or may be captured independently (e.g., capturing positioning information without capturing an image). The positioning information may also be captured by a mobile device, which may then be sent to the vehicle. The environment may, in some embodiments, be based on the positioning information. The positioning information may be compared with a map database. The map database may include information regarding the environment at specified locations. (e.g., worldwide, nationwide, public lands, or private lands). The positioning information may be used in conjunction with the captured images to identify the environment.

In some embodiments, the processor may be operable when executing instructions to control operation of one or more lights of the vehicle. The control operation may be in accordance with the illumination fields and the lighting properties. The lighting properties may include brightness 180 or color temperature 185. Lighting properties may be determined based on a time of day. For example, the brightness may be lower at 3:00 am than at 7:00 pm. In another example, color temperature 185 may be 6500K during daytime and may be 3400K during nighttime. Brightness 180 and color temperature 185 may be decreased when a time at a location of a vehicle transitions from daytime to nighttime. Brightness and color temperature 185 may also be increased when a time at a location of a vehicle transitions from nighttime to daytime. Lighting properties may also be based on ambient lighting conditions. The ambient lighting conditions may be captured by a sensor of the vehicle.

In some embodiments, the control operation may be limited by geofence 190. Geofence 190 may limit or prevent the control operation when the vehicle is not within the geofenced area. The geofenced area may be an off-road area (e.g., not a public road). Whether the vehicle is within the geofenced area may be based on the positioning information. There may be different types of geofenced areas. Each type may have its own limitations to the control operation. For example, when the vehicle is determined to be on a specified road, the maximum brightness or allowable color temperatures may be limited based on requirements set by the owner of the road. In another example, certain illumination fields (e.g., illumination fields to generate an image) may be disabled.

In some embodiments, the control operation may also be limited by certain vehicle conditions. Such conditions may include the vehicle being in park, the parking brake activated or being in a camp mode.

In some embodiments, the processors may be further operable when executing instructions to display an image, a video, or an interactive game. The image may be used as a marker to indicate a campsite. For example, the image may be a particular symbol to help a user identify which campsite is theirs. The image may also be a game board (e.g., a chess board or a checkers board). The interactive game may be one or more images or one or more videos that change based on input from a user. An example of an interactive game may be solitaire, where the user may be able to interact with the displayed image to move cards. The input may be a user gesture. For example, in the solitaire example, the user may be able to point to a card and point to a stack to move the card to that stack.

Figure 2:
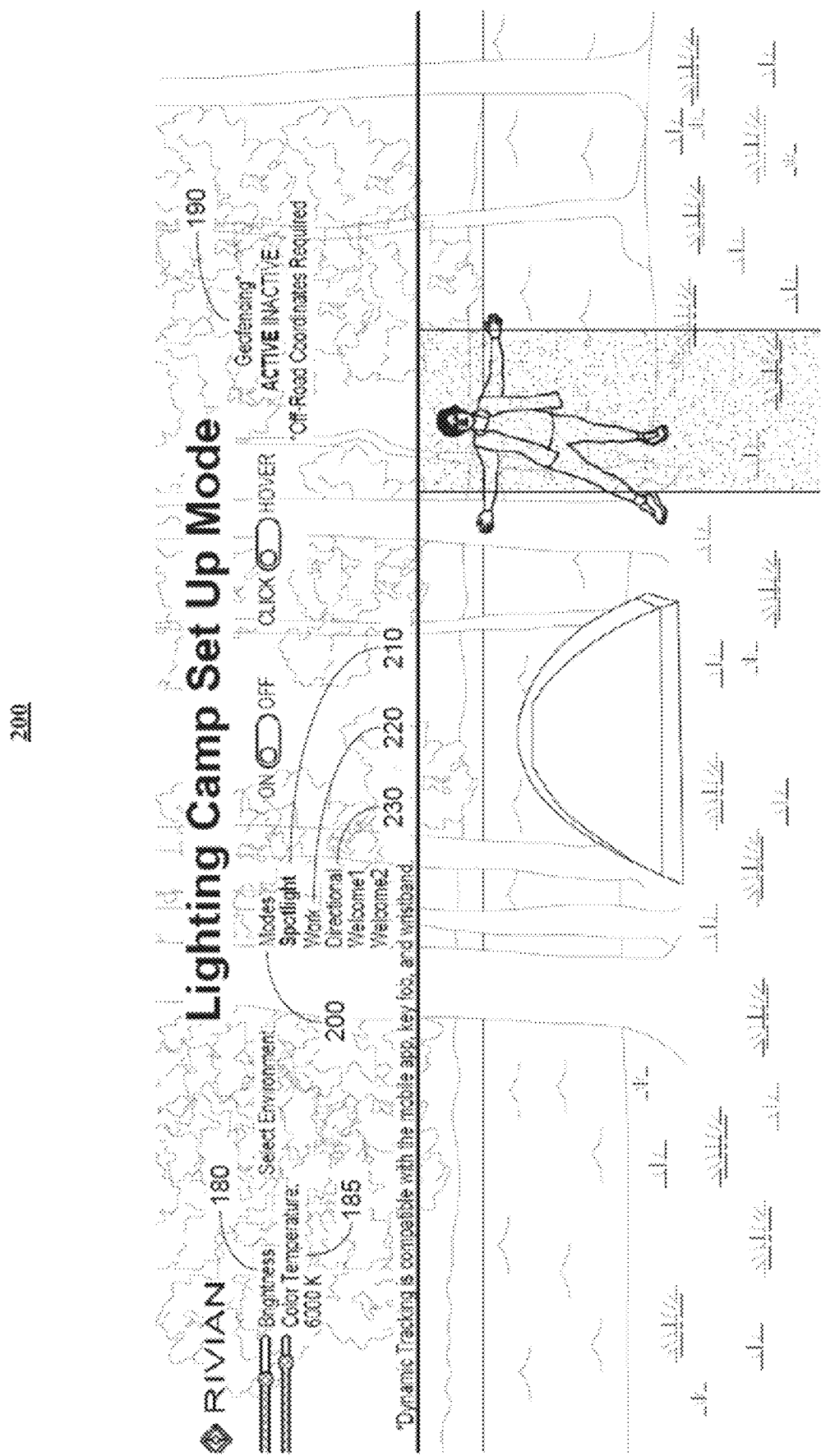
FIG. 2 illustrates an example user interface for configuring settings of a vehicle related to a spotlight mode.

FIG. 2 illustrates an example user interface for configuring settings of a vehicle related to a spotlight mode. In some embodiments, configuring settings of a vehicle may include a control system for a vehicle. The control system may include one or more processors. The control system may also include a memory. The memory may be coupled to the processors. The memory may include instructions. The processor may be operable when executing the instructions.

In some embodiments, the processor may be operable when executing instructions to receive signals from a mobile device. The mobile device may be associated with a user and may also be wirelessly connected to the vehicle. The mobile device may be a mobile phone (e.g., a smartphone), a wearable device (e.g., a smart watch), or a vehicle key (e.g., wireless key fob). The signals may be received by one or more sensors (e.g., proximity sensors, or wireless receivers). The sensors may be integrated into the door handle or may be a part of a comfort access system (e.g., a system that allows for unlocking the vehicle without interacting with the key). It should be appreciated the sensor is not limited to integration into the door and may be integrated anywhere on the vehicle. The sensors may also include radar sensors, sonar sensors, distance sensors, motion sensors, or parking sensors. The signals may also be received by the wireless receiver (e.g., BLUETOOTH, WIFI, or near-field communications). The signals may also include information. The information may include positioning information, user-selected input, or data about the associated user (e.g., user preferences).

In some embodiments, the processors may be further operable when executing instructions to determine the location of the mobile device based on the received signals. The mobile device may capture positioning information. The positioning information may be sent with the signals that are received by the vehicle.

In some embodiments, the processor may be operable when executing instructions to identify a lighting mode for illuminating an area associated with a device location. The lighting mode may include beam pattern mode 200. Beam pattern mode 200 may include spotlight mode 210, work mode 220, or directional mode 230.

In some embodiments, the processors being operable when executing instructions to determine illumination fields and lighting properties may be further based on the beam pattern mode. The processors may be further operable when executing instructions to determine a location of the person. The location of the person may be based on the device location. The device location may be determined based on the positioning information. The positioning information may be sent with the signals. The signals may be received by the vehicle. The device location may also be determined based on time intervals between signals captured by the sensor (e.g., triangulation). The processors may be further operable when executing instructions to determine the illumination field as occupied. The determination may be based on the location of the person being within an illumination field of the illumination fields.

In some embodiments, the processors may be further operable when executing instructions to capture an image proximate to the vehicle. The image may be captured by a sensor of the vehicle. The sensor may include an image sensor or a distance sensor. The processor may, in some embodiments, be further operable when executing instructions to determine the location of a person based on an image. The image may be captured by an image sensor of the vehicle. The image may be of an area proximate to the vehicle. The image may be a 360-degree image (e.g., a surround image). The person may be identified as being in the image with computer vision techniques. The location of the person may be based on where in the image the person is or the size of the person as captured in the image. The location of the person may also be based on which camera captured the image of the person (e.g., front camera or rear camera).

In some embodiments, the image sensor may capture user gestures. The determination of the illumination fields and lighting properties may be based on the user gestures. The user gesture may include body or head motions. For example, the user may raise a hand upwards to indicate a desire to increase a brightness of the illumination. The user gesture may also include facial expressions. For example, a user squinting towards the vehicle may indicate a desire to decrease the brightness of the illumination. It should be appreciated that the user gestures are not limited to controlling the brightness, but may control any lighting properties (e.g., color temperature).

In some embodiments, when the beam pattern mode is in a spotlight mode, the processors may be further operable when executing instructions to determine the occupied illumination field as the illumination field. The occupied field may include the illumination field occupied by the person. This may be determined based on the location of the illumination field and the location of the person. When in the spotlight mode, the illumination field may track the person or persons. The lighting properties may remain constant while in spotlight mode. For example, the brightness may remain the same when the person is facing the vehicle and when the person is not facing the vehicle.

In some embodiments, the location of the illumination fields may be based on positioning information of the vehicle. The positioning information may be captured by the vehicle or by the mobile device and sent to the vehicle when the mobile device is proximate to the vehicle. The location of the illumination fields may also be based on a direction of the vehicle. The direction may be measured as a cardinal direction or degrees from north (e.g., magnetic north or true north). The location of the illumination fields may also be based on an angle of the vehicle. For example, the vehicle may be angled downwards or upwards. When the vehicle is angled downwards, the illumination may reach a shortest distance when compared to a level vehicle. A combination of positioning information, direction, or angle may be used to determine the location of the illumination fields.

In some embodiments, the processor may be operable when executing instructions to control operation of one or more lights of the vehicle. The control operation may be in accordance with the illumination fields and the lighting properties. The lighting properties may include brightness 180 or color temperature 185. Lighting properties may be determined based on a time of day. For example, the brightness may be lower at 3:00 am than at 7:00 pm. In another example, color temperature 185 may be 6500K during daytime and may be 3400K during nighttime. Brightness 180 and color temperature 185 may be decreased when a time at a location of a vehicle transitions from daytime to nighttime. Brightness and color temperature 185 may also be increased when a time at a location of a vehicle transitions from nighttime to daytime. Lighting properties may also be based on ambient lighting conditions. The ambient lighting conditions may be captured by a sensor of the vehicle.

In some embodiments, the control operation may be limited by geofence 190. Geofence 190 may limit or prevent the control operation when the vehicle is not within the geofenced area. The geofenced area may be an off-road area (e.g., not a public road). Whether the vehicle is within the geofenced area may be based on the positioning information. There may be different types of geofenced areas. Each type may have its own limitations to the control operation. For example, when the vehicle is determined to be on a specified road, the maximum brightness or allowable color temperatures may be limited based on requirements set by the owner of the road. In another example, certain illumination fields (e.g., illumination fields to generate an image) may be disabled.

In some embodiments, the lighting mode may include a manual mode. The processors may be further operable when executing instructions to configure the manual mode. In the manual mode, the user may be able to select from specified options in the environment mode or the beam pattern mode. The user input may be received by the vehicle. The user may also be able to manually select specified lighting properties. For example, the user may select brightness 240 or color temperature 250. The manual mode may be limited by geofence 180 as described in FIG. 1.

In some embodiments, a user may select illumination fields and lighting properties from a mobile device. The selected illumination fields and lighting properties may be illuminated by exterior lights associated with a vehicle.

In some embodiments, the processor may be further operable when executing instructions to receive signals from a second mobile device. The disclosure enclosed herein related to the mobile device may be applicable to the second mobile device. The second mobile device may be associated with a second user and may be wirelessly connected to the vehicle. The processor may be further operable when executing instructions to modify the lighting mode and may be based on the second area associated with a second device location. The processors may be further operable when executing instructions to determine illumination fields and lighting properties based on the lighting mode and the second device location.

Figure 3:
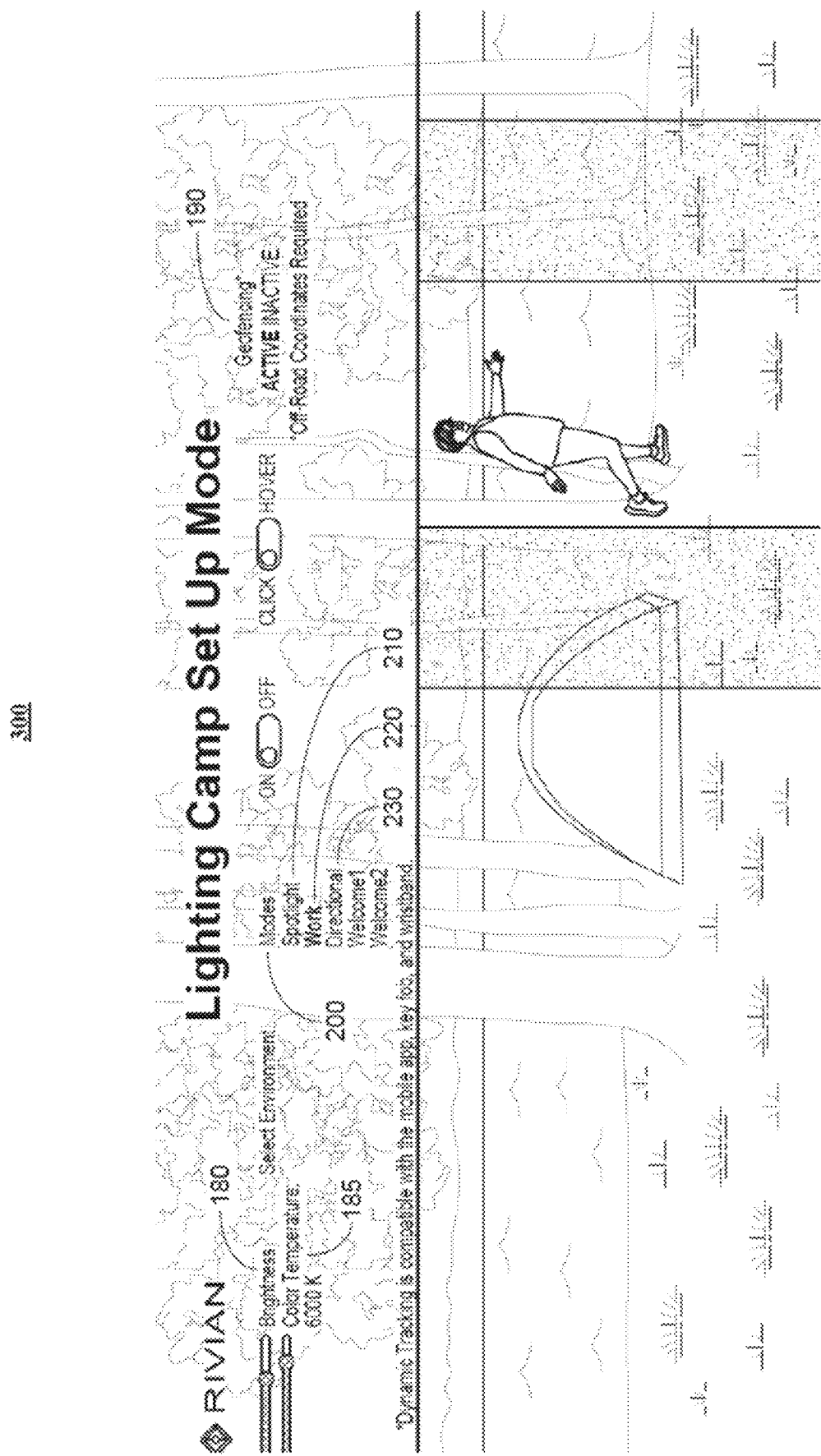
FIG. 3 illustrates an example user interface for configuring settings of a vehicle related to a work mode.

FIG. 3 illustrates an example user interface for configuring settings of a vehicle related to a work mode. In some embodiments, configuring settings of a vehicle may include a control system for a vehicle. The control system may include one or more processors. The control system may also include a memory. The memory may be coupled to the processors. The memory may include instructions. The processor may be operable when executing the instructions.

In some embodiments, the processor may be operable when executing instructions to receive signals from a mobile device. The mobile device may be associated with a user and may also be wirelessly connected to the vehicle. The mobile device may be a mobile phone (e.g., a smartphone), a wearable device (e.g., a smart watch), or a vehicle key (e.g., wireless key fob). The signals may be received by one or more sensors (e.g., proximity sensors, or wireless receivers). The sensors may be integrated into the door handle or may be a part of a comfort access system (e.g., a system that allows for unlocking the vehicle without interacting with the key). It should be appreciated the sensor is not limited to integration into the door and may be integrated anywhere on the vehicle. The sensors may also include radar sensors, sonar sensors, distance sensors, motion sensors, or parking sensors. The signals may also be received by the wireless receiver (e.g., BLUETOOTH, WIFI, or near-field communications). The signals may also include information. The information may include positioning information, user-selected input, or data about the associated user (e.g., user preferences).

In some embodiments, the processors may be further operable when executing instructions to determine the location of the mobile device based on the received signals. The mobile device may capture positioning information. The positioning information may be sent with the signals that are received by the vehicle.

In some embodiments, the processor may be operable when executing instructions to identify a lighting mode for illuminating an area associated with a device location. The lighting mode may include beam pattern mode 200. Beam pattern mode 200 may include spotlight mode 210, work mode 220, or directional mode 230.

In some embodiments, the processors being operable when executing instructions to determine illumination fields and lighting properties may be further based on the beam pattern mode. The processors may be further operable when executing instructions to determine a location of the person. The location of the person may be based on the device location. The device location may be determined based on the positioning information. The positioning information may be sent with the signals. The signals may be received by the vehicle. The device location may also be determined based on time intervals between signals captured by the sensor (e.g., triangulation). The processors may be further operable when executing instructions to determine the illumination field as occupied. The determination may be based on the location of the person being within an illumination field of the illumination fields.

In some embodiments, the processors may be further operable when executing instructions to capture an image proximate to the vehicle. The image may be captured by a sensor of the vehicle. The sensor may include an image sensor or a distance sensor. The processor may, in some embodiments, be further operable when executing instructions to determine the location of a person based on an image. The image may be captured by an image sensor of the vehicle. The image may be of an area proximate to the vehicle. The image may be a 360-degree image (e.g., a surround image). The person may be identified as being in the image with computer vision techniques. The location of the person may be based on where in the image the person is or the size of the person as captured in the image. The location of the person may also be based on which camera captured the image of the person (e.g., front camera or rear camera).

In some embodiments, the image sensor may capture user gestures. The determination of the illumination fields and lighting properties may be based on the user gestures. The user gesture may include body or head motions. For example, the user may raise a hand upwards to indicate a desire to increase a brightness of the illumination. The user gesture may also include facial expressions. For example, a user squinting towards the vehicle may indicate a desire to decrease the brightness of the illumination. It should be appreciated that the user gestures are not limited to controlling the brightness, but may control any lighting properties (e.g., color temperature).

In some embodiments, processor may be further operable when executing instructions to determine, based on the beam pattern mode being in the work mode, illumination fields adjacent to the occupied illumination field as the illumination field. When in the work mode, the illumination fields may be those directly adjacent to the occupied illumination field. The illumination fields may also include every field but the occupied illumination field. Which illumination fields that are selected may be based on features detected in an image captured by a sensor. For example, some illumination fields may not be selected when a tent is detected as being within those illumination fields. This may be advantageous to reduce illuminating others at a campsite.

In some embodiments, the location of the illumination fields may be based on positioning information of the vehicle. The positioning information may be captured by the vehicle or by the mobile device and sent to the vehicle when the mobile device is proximate to the vehicle. The location of the illumination fields may also be based on a direction of the vehicle. The direction may be measured as a cardinal direction or degrees from north (e.g., magnetic north or true north). The location of the illumination fields may also be based on an angle of the vehicle. For example, the vehicle may be angled downwards or upwards. When the vehicle is angled downwards, the illumination may reach a shortest distance when compared to a level vehicle. A combination of positioning information, direction, or angle may be used to determine the location of the illumination fields.

In some embodiments, the processor may be operable when executing instructions to control operation of one or more lights of the vehicle. The control operation may be in accordance with the illumination fields and the lighting properties. The lighting properties may include brightness 180 or color temperature 185. Lighting properties may be determined based on a time of day. For example, the brightness may be lower at 3:00 am than at 7:00 pm. In another example, color temperature 185 may be 6500K during daytime and may be 3400K during nighttime. Brightness 180 and color temperature 185 may be decreased when a time at a location of a vehicle transitions from daytime to nighttime. Brightness and color temperature 185 may also be increased when a time at a location of a vehicle transitions from nighttime to daytime. Lighting properties may also be based on ambient lighting conditions. The ambient lighting conditions may be captured by a sensor of the vehicle.

In some embodiments, the control operation may be limited by geofence 190. Geofence 190 may limit or prevent the control operation when the vehicle is not within the geofenced area. The geofenced area may be an off-road area (e.g., not a public road). Whether the vehicle is within the geofenced area may be based on the positioning information. There may be different types of geofenced areas. Each type may have its own limitations to the control operation. For example, when the vehicle is determined to be on a specified road, the maximum brightness or allowable color temperatures may be limited based on requirements set by the owner of the road. In another example, certain illumination fields (e.g., illumination fields to generate an image) may be disabled.

In some embodiments, the processor may be further operable when executing instructions to receive signals from a second mobile device. The disclosure enclosed herein related to the mobile device may be applicable to the second mobile device. The second mobile device may be associated with a second user and may be wirelessly connected to the vehicle. The processor may be further operable when executing instructions to modify the lighting mode and may be based on the second area associated with a second device location. The processors may be further operable when executing instructions to determine illumination fields and lighting properties based on the lighting mode and the second device location.

Figure 4:
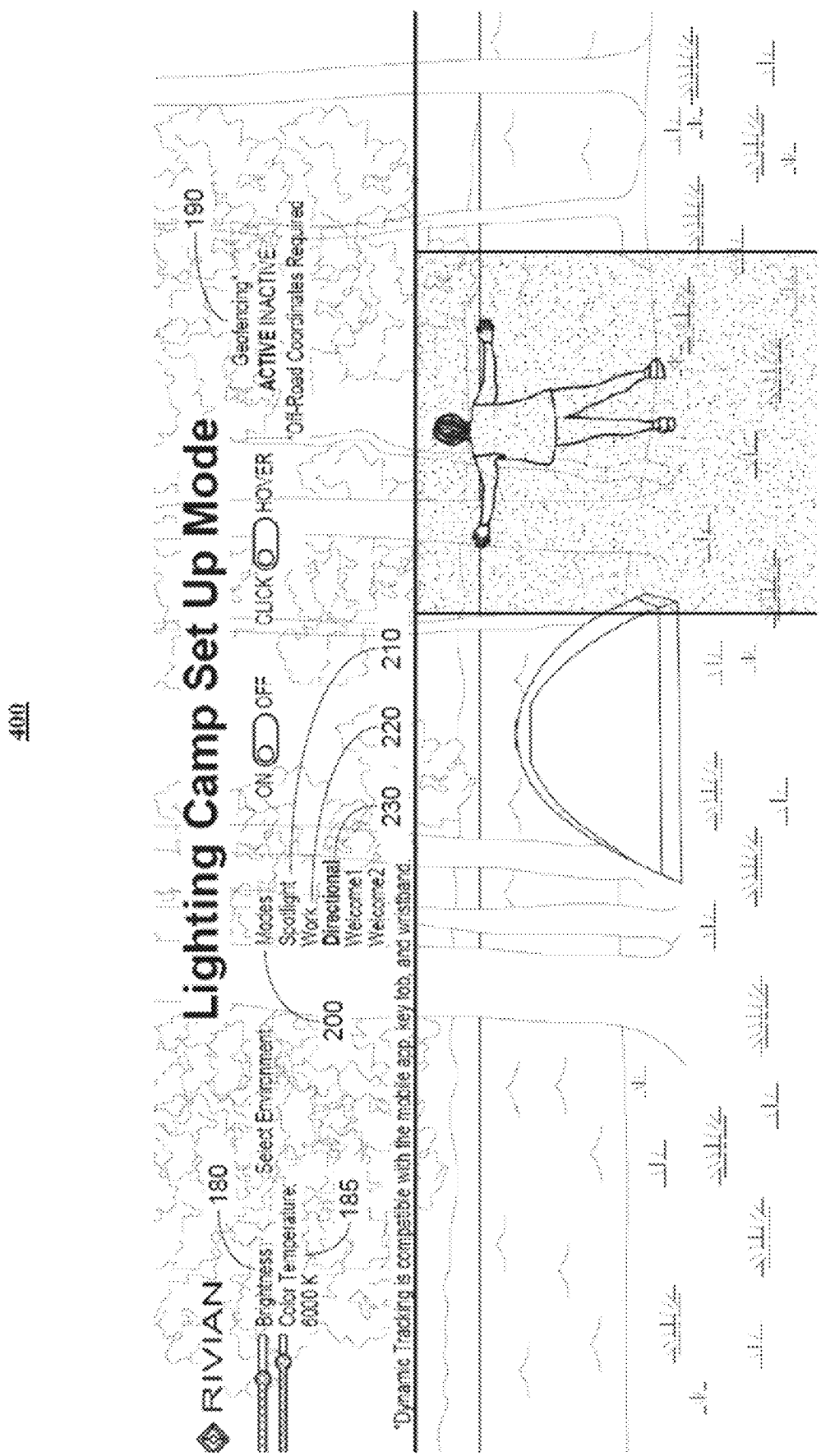
FIG. 4 illustrates an example user interface for configuring settings of a vehicle related to a directional mode when the person is facing away from the vehicle.

FIG. 4 illustrates an example user interface for configuring settings of a vehicle related to a directional mode when the person is facing away from the vehicle. In some embodiments, configuring settings of a vehicle may include a control system for a vehicle. The control system may include one or more processors. The control system may also include a memory. The memory may be coupled to the processors. The memory may include instructions. The processor may be operable when executing the instructions.

In some embodiments, the processor may be operable when executing instructions to receive signals from a mobile device. The mobile device may be associated with a user and may also be wirelessly connected to the vehicle. The mobile device may be a mobile phone (e.g., a smartphone), a wearable device (e.g., a smart watch), or a vehicle key (e.g., wireless key fob). The signals may be received by one or more sensors (e.g., proximity sensors, or wireless receivers). The sensors may be integrated into the door handle or may be a part of a comfort access system (e.g., a system that allows for unlocking the vehicle without interacting with the key). It should be appreciated the sensor is not limited to integration into the door and may be integrated anywhere on the vehicle. The sensors may also include radar sensors, sonar sensors, distance sensors, motion sensors, or parking sensors. The signals may also be received by the wireless receiver (e.g., BLUETOOTH, WIFI, or near-field communications). The signals may also include information. The information may include positioning information, user-selected input, or data about the associated user (e.g., user preferences).

In some embodiments, the processors may be further operable when executing instructions to determine the location of the mobile device based on the received signals. The mobile device may capture positioning information. The positioning information may be sent with the signals that are received by the vehicle.

In some embodiments, the processor may be operable when executing instructions to identify a lighting mode for illuminating an area associated with a device location. The lighting mode may include beam pattern mode 200. Beam pattern mode 200 may include spotlight mode 210, work mode 220, or directional mode 230.

In some embodiments, the processors being operable when executing instructions to determine illumination fields and lighting properties may be further based on the beam pattern mode. The processors may be further operable when executing instructions to determine a location of the person. The location of the person may be based on the device location. The device location may be determined based on the positioning information. The positioning information may be sent with the signals. The signals may be received by the vehicle. The device location may also be determined based on time intervals between signals captured by the sensor (e.g., triangulation). The processors may be further operable when executing instructions to determine the illumination field as occupied. The determination may be based on the location of the person being within an illumination field of the illumination fields.

In some embodiments, the processors may be further operable when executing instructions to capture an image proximate to the vehicle. The image may be captured by a sensor of the vehicle. The sensor may include an image sensor or a distance sensor. The processor may, in some embodiments, be further operable when executing instructions to determine the location of a person based on an image. The image may be captured by an image sensor of the vehicle. The image may be of an area proximate to the vehicle. The image may be a 360-degree image (e.g., a surround image). The person may be identified as being in the image with computer vision techniques. The location of the person may be based on where in the image the person is or the size of the person as captured in the image. The location of the person may also be based on which camera captured the image of the person (e.g., front camera or rear camera).

In some embodiments, the image sensor may capture user gestures. The determination of the illumination fields and lighting properties may be based on the user gestures. The user gesture may include body or head motions. For example, the user may raise a hand upwards to indicate a desire to increase a brightness of the illumination. The user gesture may also include facial expressions. For example, a user squinting towards the vehicle may indicate a desire to decrease the brightness of the illumination. It should be appreciated that the user gestures are not limited to controlling the brightness, but may control any lighting properties (e.g., color temperature).

In some embodiments, processor may be further operable when executing instructions to determine, based on the beam pattern mode being in a directional mode, the occupied illumination field as the illumination field. When the person is detected as facing away from the vehicle, the brightness may be maintained or increased. This may be advantageous to maximize the brightness available to the user. The direction of the person may be detected based on images captured by a sensor. The processor may be further operable when executing instructions to identify eyes associated with the person in the image. When no eyes associated with the person are detected, the person may be determined to be facing away. When eyes associated with the person are detected, the person may be determined to be facing towards the vehicle.

In some embodiments, the location of the illumination fields may be based on positioning information of the vehicle. The positioning information may be captured by the vehicle or by the mobile device and sent to the vehicle when the mobile device is proximate to the vehicle. The location of the illumination fields may also be based on a direction of the vehicle. The direction may be measured as a cardinal direction or degrees from north (e.g., magnetic north or true north). The location of the illumination fields may also be based on an angle of the vehicle. For example, the vehicle may be angled downwards or upwards. When the vehicle is angled downwards, the illumination may reach a shortest distance when compared to a level vehicle. A combination of positioning information, direction, or angle may be used to determine the location of the illumination fields.

In some embodiments, the processor may be operable when executing instructions to control operation of one or more lights of the vehicle. The control operation may be in accordance with the illumination fields and the lighting properties. The lighting properties may include brightness 180 or color temperature 185. Lighting properties may be determined based on a time of day. For example, the brightness may be lower at 3:00 am than at 7:00 pm. In another example, color temperature 185 may be 6500K during daytime and may be 3400K during nighttime. Brightness 180 and color temperature 185 may be decreased when a time at a location of a vehicle transitions from daytime to nighttime. Brightness and color temperature 185 may also be increased when a time at a location of a vehicle transitions from nighttime to daytime. Lighting properties may also be based on ambient lighting conditions. The ambient lighting conditions may be captured by a sensor of the vehicle.

In some embodiments, the control operation may be limited by geofence 190. Geofence 190 may limit or prevent the control operation when the vehicle is not within the geofenced area. The geofenced area may be an off-road area (e.g., not a public road). Whether the vehicle is within the geofenced area may be based on the positioning information. There may be different types of geofenced areas. Each type may have its own limitations to the control operation. For example, when the vehicle is determined to be on a specified road, the maximum brightness or allowable color temperatures may be limited based on requirements set by the owner of the road. In another example, certain illumination fields (e.g., illumination fields to generate an image) may be disabled.

In some embodiments, the processor may be further operable when executing instructions to receive signals from a second mobile device. The disclosure enclosed herein related to the mobile device may be applicable to the second mobile device. The second mobile device may be associated with a second user and may be wirelessly connected to the vehicle. The processor may be further operable when executing instructions to modify the lighting mode and may be based on the second area associated with a second device location. The processors may be further operable when executing instructions to determine illumination fields and lighting properties based on the lighting mode and the second device location.

Figure 5:
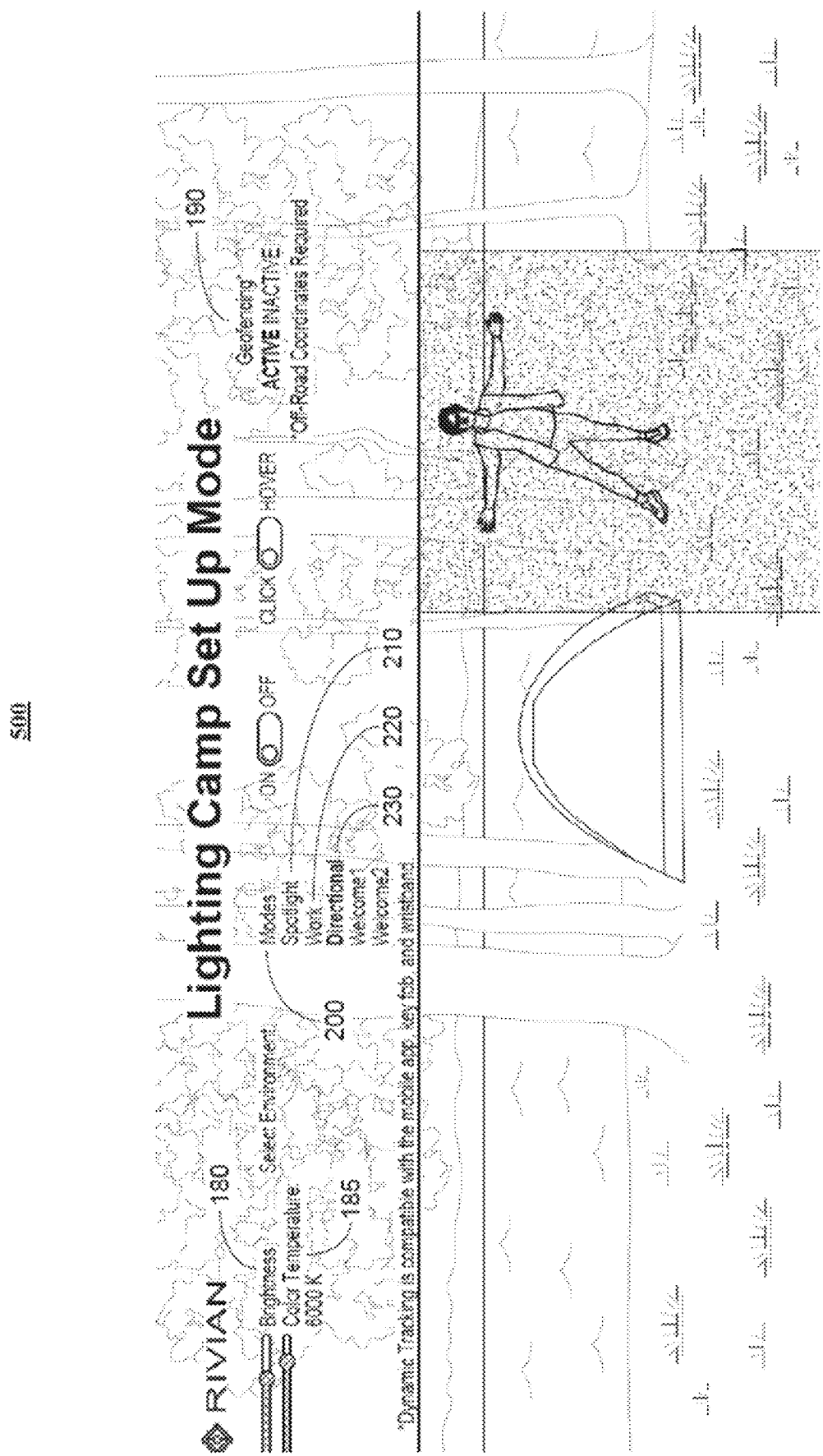
FIG. 5 illustrates an example user interface for configuring settings of a vehicle related to a directional mode when the person is facing towards the vehicle.

FIG. 5 illustrates an example user interface for configuring settings of a vehicle related to a directional mode when the person is facing towards the vehicle. In some embodiments, configuring settings of a vehicle may include a control system for a vehicle. The control system may include one or more processors. The control system may also include a memory. The memory may be coupled to the processors. The memory may include instructions. The processor may be operable when executing the instructions.

In some embodiments, the processor may be operable when executing instructions to receive signals from a mobile device. The mobile device may be associated with a user and may also be wirelessly connected to the vehicle. The mobile device may be a mobile phone (e.g., a smartphone), a wearable device (e.g., a smart watch), or a vehicle key (e.g., wireless key fob). The signals may be received by one or more sensors (e.g., proximity sensors, or wireless receivers). The sensors may be integrated into the door handle or may be a part of a comfort access system (e.g., a system that allows for unlocking the vehicle without interacting with the key). It should be appreciated the sensor is not limited to integration into the door and may be integrated anywhere on the vehicle. The sensors may also include radar sensors, sonar sensors, distance sensors, motion sensors, or parking sensors. The signals may also be received by the wireless receiver (e.g., BLUETOOTH, WIFI, or near-field communications). The signals may also include information. The information may include positioning information, user-selected input, or data about the associated user (e.g., user preferences).

In some embodiments, the processors may be further operable when executing instructions to determine the location of the mobile device based on the received signals. The mobile device may capture positioning information. The positioning information may be sent with the signals that are received by the vehicle.

In some embodiments, the processor may be operable when executing instructions to identify a lighting mode for illuminating an area associated with a device location. The lighting mode may include beam pattern mode 200. Beam pattern mode 200 may include spotlight mode 210, work mode 220, or directional mode 230.

In some embodiments, the processors being operable when executing instructions to determine illumination fields and lighting properties may be further based on the beam pattern mode. The processors may be further operable when executing instructions to determine a location of the person. The location of the person may be based on the device location. The device location may be determined based on the positioning information. The positioning information may be sent with the signals. The signals may be received by the vehicle. The device location may also be determined based on time intervals between signals captured by the sensor (e.g., triangulation). The processors may be further operable when executing instructions to determine the illumination field as occupied. The determination may be based on the location of the person being within an illumination field of the illumination fields.

In some embodiments, the processors may be further operable when executing instructions to capture an image proximate to the vehicle. The image may be captured by a sensor of the vehicle. The sensor may include an image sensor or a distance sensor. The processor may, in some embodiments, be further operable when executing instructions to determine the location of a person based on an image. The image may be captured by an image sensor of the vehicle. The image may be of an area proximate to the vehicle. The image may be a 360-degree image (e.g., a surround image). The person may be identified as being in the image with computer vision techniques. The location of the person may be based on where in the image the person is or the size of the person as captured in the image. The location of the person may also be based on which camera captured the image of the person (e.g., front camera or rear camera).

In some embodiments, the image sensor may capture user gestures. The determination of the illumination fields and lighting properties may be based on the user gestures. The user gesture may include body or head motions. For example, the user may raise a hand upwards to indicate a desire to increase a brightness of the illumination. The user gesture may also include facial expressions. For example, a user squinting towards the vehicle may indicate a desire to decrease the brightness of the illumination. It should be appreciated that the user gestures are not limited to controlling the brightness, but may control any lighting properties (e.g., color temperature).

In some embodiments, processor may be further operable when executing instructions to determine, based on the beam pattern mode being in a directional mode, the occupied illumination field as the illumination field. When the person is detected as facing towards the vehicle, the brightness may be decreased. This may be advantageous to maximize the brightness available to the user. The direction of the person may be detected based on images captured by a sensor. The processor may be further operable when executing instructions to identify eyes associated with the person in the image. When no eyes associated with the person are detected, the person may be determined to be facing away. When eyes associated with the person are detected, the person may be determined to be facing towards the vehicle.

In some embodiments, the location of the illumination fields may be based on positioning information of the vehicle. The positioning information may be captured by the vehicle or by the mobile device and sent to the vehicle when the mobile device is proximate to the vehicle. The location of the illumination fields may also be based on a direction of the vehicle. The direction may be measured as a cardinal direction or degrees from north (e.g., magnetic north or true north). The location of the illumination fields may also be based on an angle of the vehicle. For example, the vehicle may be angled downwards or upwards. When the vehicle is angled downwards, the illumination may reach a shortest distance when compared to a level vehicle. A combination of positioning information, direction, or angle may be used to determine the location of the illumination fields.

In some embodiments, the processor may be operable when executing instructions to control operation of one or more lights of the vehicle. The control operation may be in accordance with the illumination fields and the lighting properties. The lighting properties may include brightness 180 or color temperature 185. Lighting properties may be determined based on a time of day. For example, the brightness may be lower at 3:00 am than at 7:00 pm. In another example, color temperature 185 may be 6500K during daytime and may be 3400K during nighttime. Brightness 180 and color temperature 185 may be decreased when a time at a location of a vehicle transitions from daytime to nighttime. Brightness and color temperature 185 may also be increased when a time at a location of a vehicle transitions from nighttime to daytime. Lighting properties may also be based on ambient lighting conditions. The ambient lighting conditions may be captured by a sensor of the vehicle.

In some embodiments, the control operation may be limited by geofence 190. Geofence 190 may limit or prevent the control operation when the vehicle is not within the geofenced area. The geofenced area may be an off-road area (e.g., not a public road). Whether the vehicle is within the geofenced area may be based on the positioning information. There may be different types of geofenced areas. Each type may have its own limitations to the control operation. For example, when the vehicle is determined to be on a specified road, the maximum brightness or allowable color temperatures may be limited based on requirements set by the owner of the road. In another example, certain illumination fields (e.g., illumination fields to generate an image) may be disabled.

In some embodiments, the processor may be further operable when executing instructions to receive signals from a second mobile device. The disclosure enclosed herein related to the mobile device may be applicable to the second mobile device. The second mobile device may be associated with a second user and may be wirelessly connected to the vehicle. The processor may be further operable when executing instructions to modify the lighting mode and may be based on the second area associated with a second device location. The processors may be further operable when executing instructions to determine illumination fields and lighting properties based on the lighting mode and the second device location.

Figure 6:
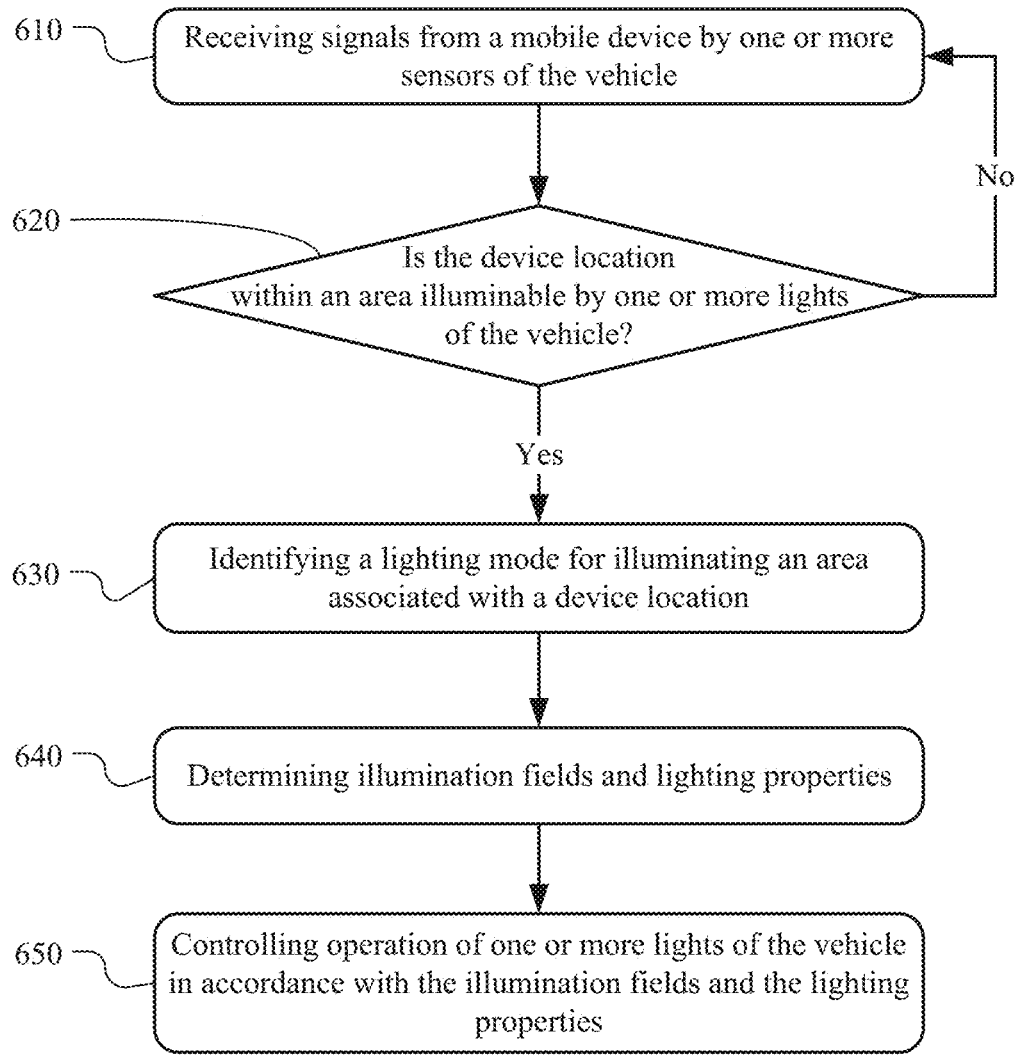
FIG. 6 is a flowchart illustrating steps of a method for configuring an illumination associated with a vehicle.

FIG. 6 is a flowchart illustrating steps of a method 600 for configuring an illumination associated with a vehicle. Method 600 may be performed by a control module. Method 600 may begin at step 610 with receiving signals from a mobile device. The signals from the mobile device may be associated with a user and may be wirelessly connected to the vehicle. The signals may be received by one or more sensors. At decision point 620, the control module may determine whether the device location is within an area illuminable by one or more lights of the vehicle. If yes, method 600 may then continue at step 630 with identifying a lighting mode for illuminating an area. The area may be associated with a device location. Method 600 may continue at step 640 with determining illumination fields and lighting properties. The determination may be based on the lighting mode and the device location. Method 600 may continue at step 650 with controlling operation of one or more lights of the vehicle. The control operation may be in accordance with the illumination fields and the lighting properties. Otherwise, if no, then method 600 may return to step 610.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for configuring an illumination associated with a vehicle including the particular steps of the method of FIG. 6, this disclosure contemplates any suitable method for configuring an illumination associated with a vehicle including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
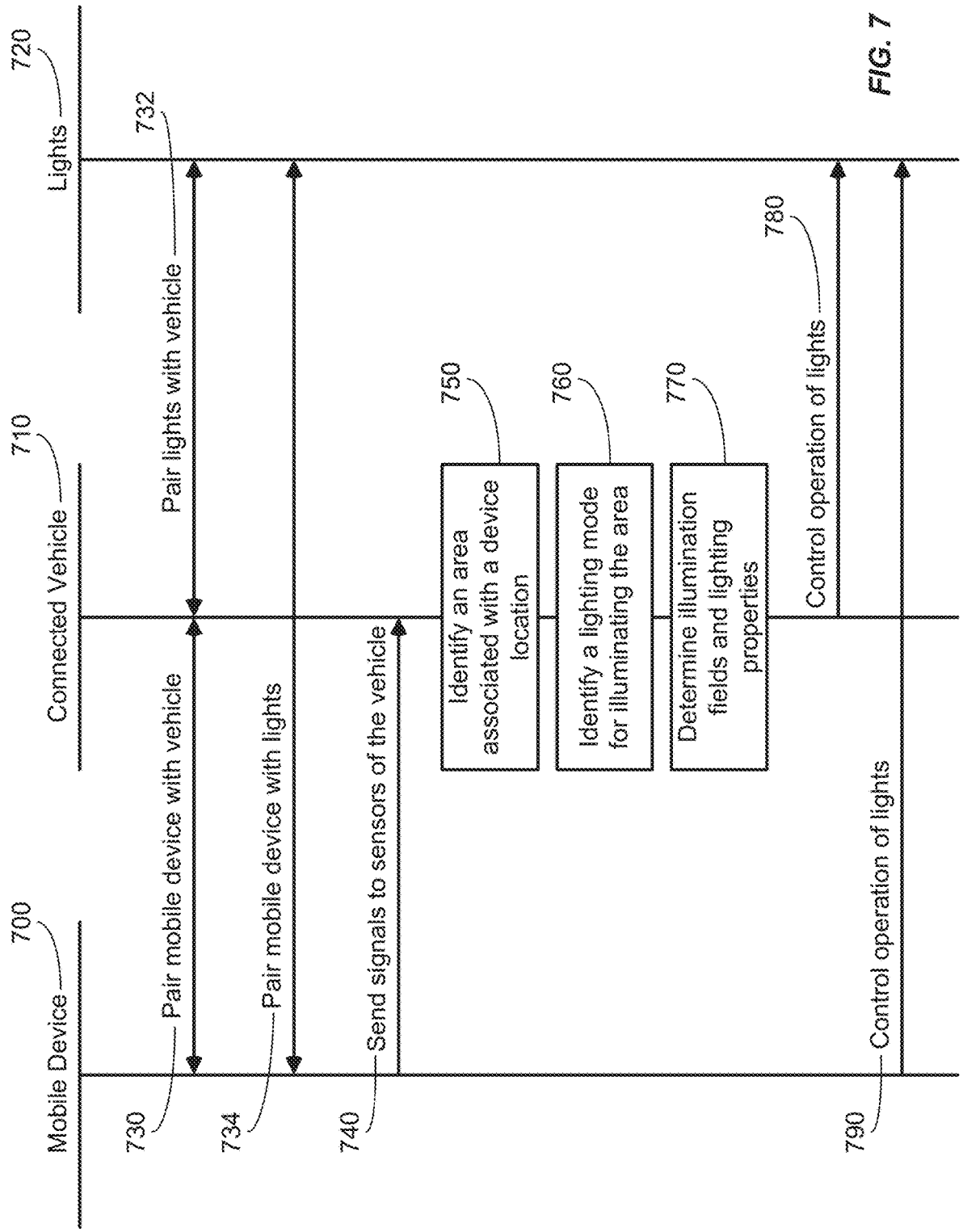
FIG. 7 is a diagram illustrating exchanges between a mobile device, a connected vehicle, and one or more lights.

FIG. 7 is a diagram illustrating exchanges between mobile device 700, connected vehicle 710, and one or more lights 720.

In some embodiments, the connected vehicle may be paired 730 with mobile device 710. The connected vehicle may also be paired 732 with lights 720. Mobile device 700 may, in some embodiments, pair 734 with lights 720.

In some embodiments, mobile device 700 may send 740 signals to vehicle 710. The signals may be received by sensors or receivers of vehicle 710. The signals may include positioning information of mobile device 700 or vehicle 710. Based on the positioning information of mobile device 700, a location of the person may be determined.

In some embodiments, the vehicle may identify 750 an area associated with the device location. Vehicle 710 may identify 760 a lighting mode for illuminating the area. In some embodiments, vehicle 710 may determine 770 illumination fields and lighting properties.

Based on the illumination fields and lighting properties, a control operation 780 may be sent to lights 720. Control operation 780 may cause lights 720 to change its output to match the requested illumination fields and lighting properties. Control operation 790 may also be sent from mobile device 700. For example, the user may manually control the illumination fields and lighting properties without entering vehicle 710.

Figure 8:
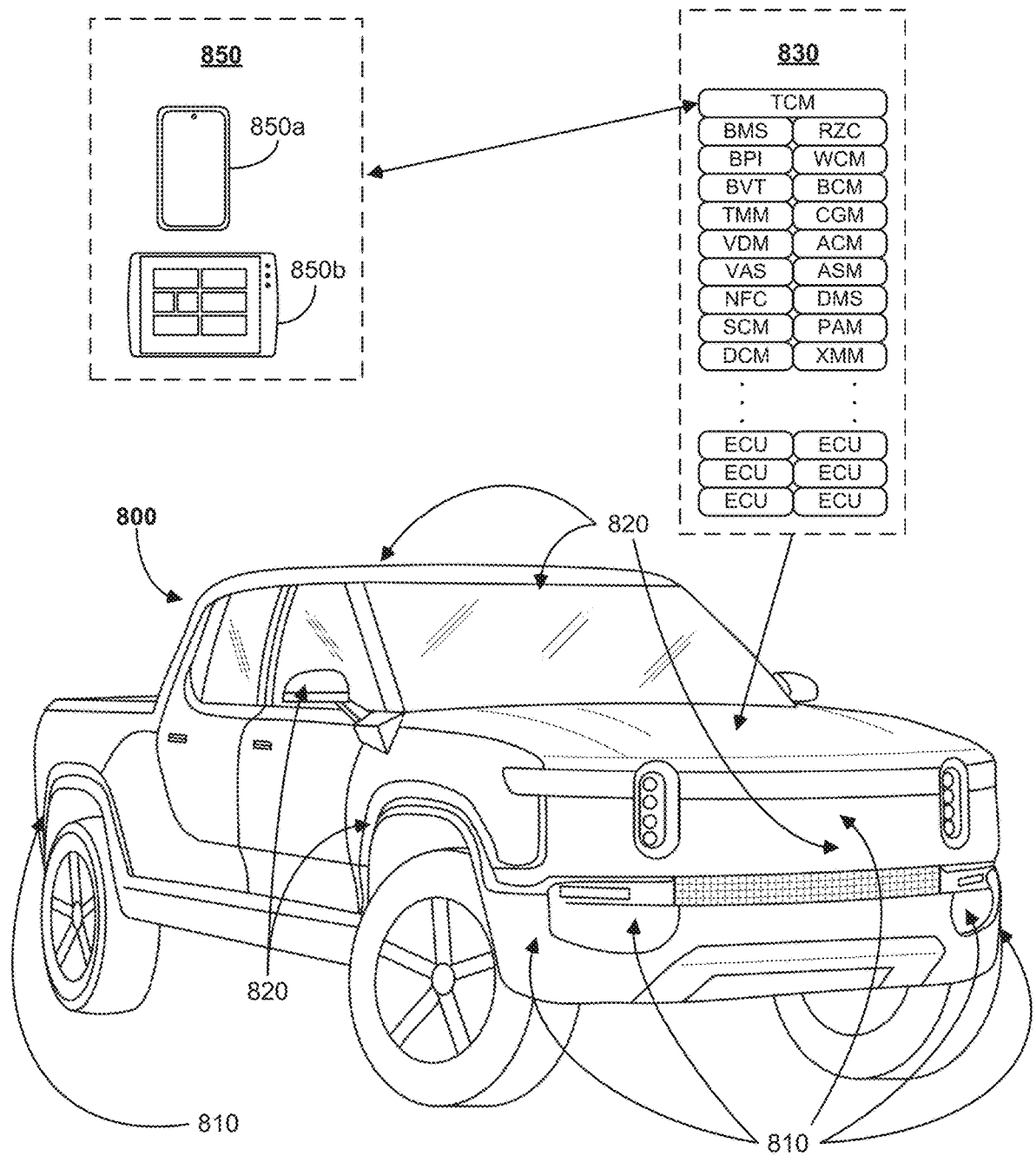
FIG. 8 illustrates an example vehicle.

FIG. 8 illustrates an example vehicle 800. Vehicle 800 may include multiple sensors 810, multiple cameras 820, and a control system 830. In some embodiments, vehicle 800 may be able to pair with a computing device 850 (e.g., smartphone 850a, tablet computing device 850b, or a smart vehicle accessory). As an example and not by way of limitation, a sensor 810 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 820 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 800 may include various controllable components (e.g., doors, seats, windows, lights, HVAC, entertainment system, security system), instrument and information displays and/or interactive interfaces, functionality to pair a computing device 850 with the vehicle (which may enable control of certain vehicle functions using the computing device 850), and functionality to pair accessories with the vehicle, which may then be controllable through an interactive interface in the vehicle or through a paired computing device 850.

Control system 830 may enables control of various systems on-board the vehicle. As shown in FIG. 8, control system 830 may comprise one or more electronic control units (ECUs), each of which are dedicated to a specific set of functions. Each ECU may be a computer system (as described further in FIG. 10), and each ECU may include functionality provide by one or more of the example ECUs described below.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 850, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 830.

Vehicle 800 may include one or more additional ECUs, such as, by way of example and not limitation: a Vehicle Access System (VAS) ECU, a Vehicle Dynamics Module (VDM) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 800 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 9:
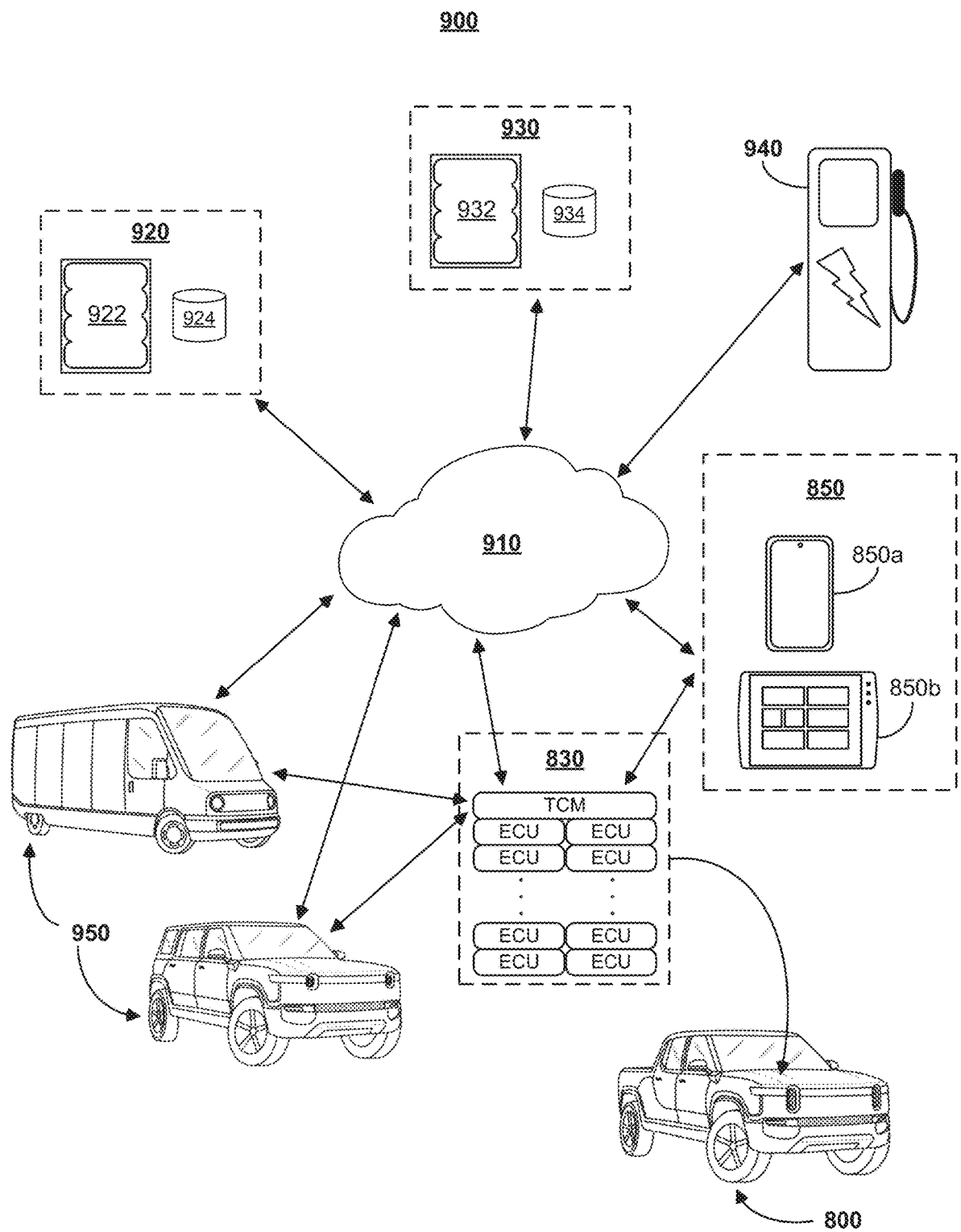
FIG. 9 illustrates an example network system including a connected vehicle.

FIG. 9 illustrates an example networked environment 900. Computer system 900 may include a connected vehicle 800 with a control system 830 that is capable of transmitting data to/from a network 910. Network 910 may also be connected to one or more computing servers 920 (e.g., including compute units 922 and storage units 924) associated with a vehicle manufacturer, a vehicle service provider, a vehicle fleet operator, or a vehicle-charging facility provider. Network 910 may also be connected to one or more third-party computing servers 930 (e.g., including compute units 932 and storage units 934) associated with, for example, a smart accessory manufacturer, a group event organizer, service provider, or a governmental organization. Networked environment 900 may include one or more landscape features 940 (e.g., automated toll road sensors, smart road signs or road markers, automated toll gates, power dispensers at charging stations). Networked environment 900 may also include other connected vehicles 950 that may be capable of communicating with vehicle 800 through network 910 and/or directly with vehicle 800 (e.g., by communicating with a TCM ECU of a control system 830 of vehicle 800 when connected vehicle 950 is within range of a short-range communications network, such as Bluetooth). Networked environment 900 may also include one or more computing devices 850 (e.g., smartphone 850a, a tablet computing device 850b, or a smart vehicle accessory) capable of communicating with network 910 and/or directly with vehicle 800.

Networked environment 900 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 800 to deduct a toll from a specified account and provides confirmation of the transaction). In particular embodiments, one or more elements of networked environment 900 may include one or more computer systems, as described in further detail with respect to FIG. 10A. In particular embodiments, one or more elements of networked environment 900 perform one or more steps of one or more methods described or illustrated herein. In particular embodiments, software running on one or more elements of networked environment 900 may be controlled by a single entity to perform one or more steps of one or more methods described or illustrated herein or provide functionality described or illustrated herein.

Figures 10A, 10B:
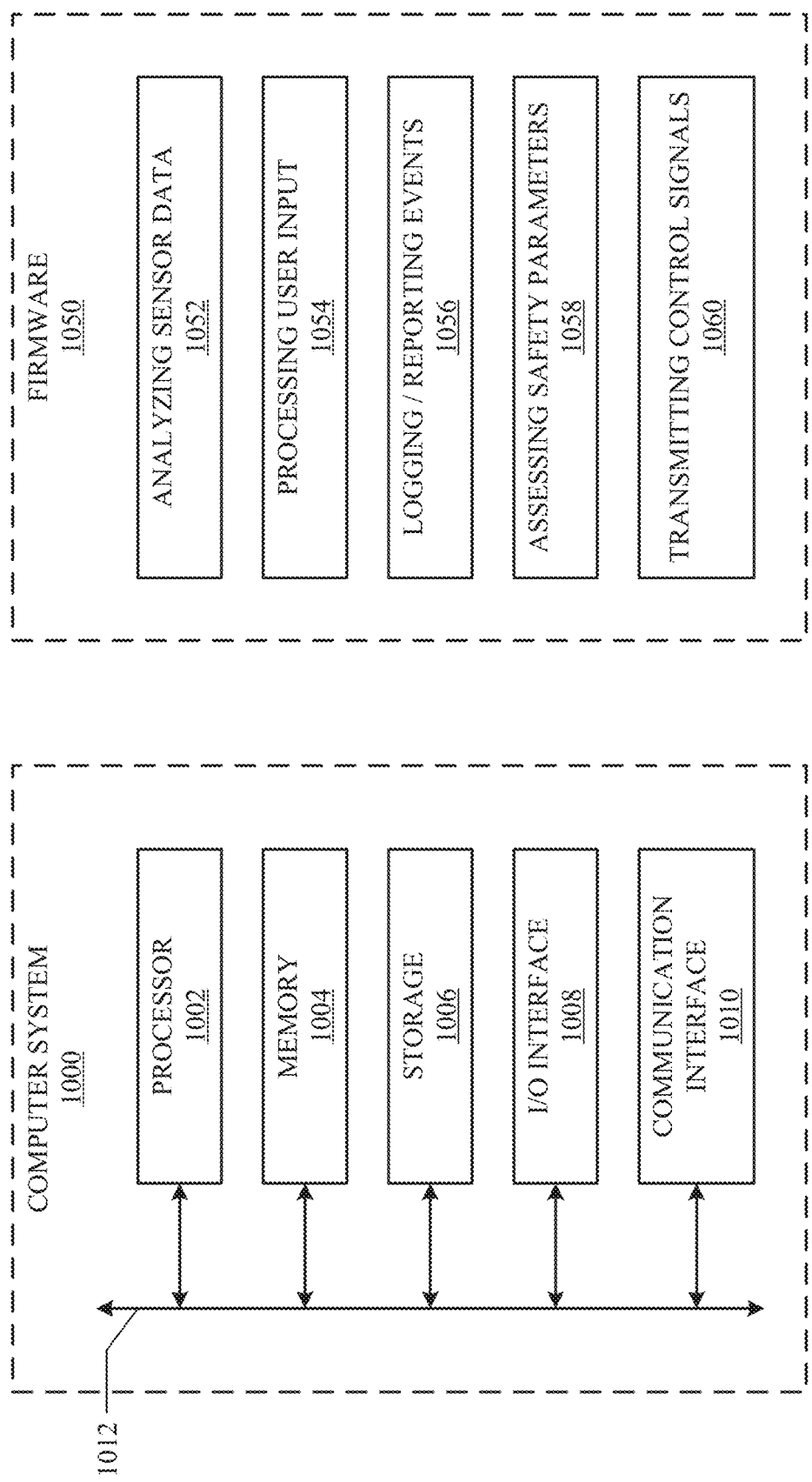
FIG. 10A is a schematic of an example computer system.
FIG. 10B illustrates example firmware for a vehicle ECU.

FIG. 10A illustrates an example computer system 1000. Computer system 1000 may include a processor 1002, memory 1004, storage 1006, an input/output (I/O) interface 1008, a communication interface 1010, and a bus 1012. Although this disclosure describes one example computer system including specified components in a particular arrangement, this disclosure contemplates any suitable computer system with any suitable number of any suitable components in any suitable arrangement. As an example and not by way of limitation, computer system 1000 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1000 may include one or more computer systems 1000; be unitary or distributed, span multiple locations, machines, or data centers; or reside in a cloud, which may include one or more cloud components in one or more networks. Where appropriate, computer system(s) 1000 may perform, at different times or at different locations, in real time or in batch mode, one or more steps of one or more methods described or illustrated herein.

Processor 1002 (e.g., compute units 922 and 932) may include hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006 (e.g., storage units 924 and 934). Processor 1002 may include one or more internal caches for data, instructions, or addresses.

In particular embodiments, memory 1004 includes main memory for storing instructions for processor 1002 to execute or data for processor 1002 to operate on. In particular embodiments, one or more memory management units (MMUs) reside between processor 1002 and memory 1004 and facilitate accesses to memory 1004 requested by processor 1002. In particular embodiments, memory 1004 includes random access memory (RAM). This disclosure contemplates any suitable RAM.

In particular embodiments, storage 1006 includes mass storage for data or instructions. As an example and not by way of limitation, storage 1006 may include a removable disk drive, flash memory, an optical disc, a magneto-optical disc, magnetic tape, or a Universal Serial Bus (USB) drive or two or more of these. Storage 1006 may include removable or fixed media and may be internal or external to computer system 1000. Storage 1006 may include any suitable form of non-volatile, solid-state memory or read-only memory (ROM).

In particular embodiments, I/O interface 1008 includes hardware, software, or both, providing one or more interfaces for communication between computer system 1000 and one or more input and/or output (I/O) devices. Computer system 1000 may be communicably connected to one or more of these I/O devices, which may be incorporated into, plugged into, paired with, or otherwise communicably connected to vehicle 800 (e.g., through the TCM ECU). An input device may include any suitable device for converting volitional user input into digital signals that can be processed by computer system 1000, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 810 described above. An output device may include devices designed to receive digital signals from computer system 1000 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1008 for them. I/O interface 1008 may include one or more I/O interfaces 1008, where appropriate.

In particular embodiments, communication interface 1010 includes hardware, software, or both providing one or more interfaces for data communication between computer system 1000 and one or more other computer systems 1000 or one or more networks.

Communication interface 1010 may include one or more interfaces to a controller area network (CAN) or to a local interconnect network (LIN). Communication interface 1010 may include one or more of a serial peripheral interface (SPI) or an isolated serial peripheral interface (isoSPI). In some embodiments, communication interface 1010 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1012 includes hardware, software, or both coupling components of computer system 1000 to each other. Bus 1012 may include any suitable bus, as well as one or more buses 1012, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 10B illustrates example firmware 1050 for a vehicle ECU 1000 as described with respect to control system 830. Firmware 1050 may include functions 1052 for analyzing sensor data based on signals received from sensors 810 or cameras 820 received through communication interface 1010. Firmware 1050 may include functions 1054 for processing user input (e.g., directly provided by a driver of or passenger in vehicle 800, or provided through a computing device 850) received through I/O interface 1008. Firmware 1050 may include functions 1056 for logging detected events (which may be stored in storage 1006 or uploaded to the cloud), as well as functions for reporting detected events (e.g., to a driver or passenger of the vehicle through an instrument display or interactive interface of the vehicle, or to a vehicle manufacturer, service provider, or third party through communication interface 1010). Firmware 1050 may include functions 1058 for assessing safety parameters (e.g., monitoring the temperature of a vehicle battery or the distance between vehicle 800 and nearby vehicles). Firmware 1050 may include functions 1060 for transmitting control signals to components of vehicle 800, including other vehicle ECUs 1000.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A control system for a vehicle, the control system comprising one or more processors and a memory coupled to the processors comprising instructions executable by the processor, the processors being operable when executing the instructions to:
   receive, by one or more sensors of the vehicle, signals from a mobile device associated with a user and wirelessly connected to the vehicle;
   identify a lighting mode for illuminating an area associated with a device location;
   determine, based on the lighting mode and the device location, illumination fields and lighting properties; and
   control operation of one or more lights of the vehicle in accordance with the illumination fields and the lighting properties.

2. The system of claim 1, wherein the lighting mode comprises:
   an environment mode;
   a beam pattern mode, wherein the beam pattern mode comprises a spotlight mode, a work mode, or a directional mode; or
   a manual mode.

3. The system of claim 2, wherein the processors being operable when executing instructions to determine illumination fields and lighting properties is further based on the environment mode and are further operable when executing instructions to:
   capture, by an image sensor of the vehicle, an image of an area proximate to the vehicle;
   identify, based on the image, an environment; and
   determine, based on the environment, the illumination fields and lighting properties.

4. The system of claim 2, wherein the processors being operable when executing instructions to determine illumination fields and lighting properties is further based on the beam pattern mode and are further operable when executing instructions to:
  determine, based on the device location, a location of a person; and
  determine, based on the location of the person being within an illumination field of the illumination fields, the illumination field as occupied.

5. The system of claim 4, wherein the processors being operable when executing instructions to determine illumination fields and lighting properties is further based on the beam pattern mode and are further operable when executing instructions to:
  determine, based on the beam pattern mode being in the spotlight mode, the occupied illumination field as the illumination field;
  determine, based on the beam pattern mode being in the work mode, illumination fields adjacent to the occupied illumination field as the illumination field; or
  determine, based on the beam pattern mode being in the directional mode, the occupied illumination field as the illumination field.

6. The system of claim 1, wherein the processors are further operable when executing instructions to:
  determine, based on time intervals between signals captured by the one or more sensors, a location of the mobile device.

7. The system of claim 1, wherein the processors are further operable when executing instructions to:
  receive, by a sensor of the vehicle, signals from the mobile device; and
  determine, based on information in the signals, a location of the mobile device, wherein the information comprises geo-spatial positioning data.

8. The system of claim 1, wherein the processors being operable when executing instructions to determine illumination fields and lighting properties is further based on a location of a person and are further operable when executing instructions to:
  capture, by an image sensor of the vehicle, an image of an area proximate to the vehicle;
  identify, based on the image, a person being within the image; and
  determine, based on the image, the location of the person.

9. The system of claim 8, wherein the processors being operable when executing instructions to determine illumination fields and lighting properties is further based on a direction the person is facing, wherein a brightness of the lighting properties decreases when the person is facing towards the vehicle.

10. The system of claim 2, wherein the processors being operable when executing instructions to determine illumination fields and lighting properties is further based on the manual mode and are further operable when executing instructions to:
  configure the manual mode;
  receive user-input associated with the illumination fields and lighting properties.

11. The system of claim 1, wherein the processors being operable when executing instructions to determine illumination fields and lighting properties is further based on user gestures captured by an image sensor of the vehicle.

12. The system of claim 1, wherein the processors are further operable when executing instructions to:
  determine a location of the vehicle;
  identify, based on the location of the vehicle, a maximum allowed brightness associated with the lighting properties; and
  limit, based on the maximum allowed brightness, a brightness associated with the lighting properties.

13. The system of claim 1, wherein the processors are further operable when executing instructions to:
  identify, based on a location of the vehicle, allowed color temperatures associated with the lighting properties; and
  limit, based on the allowed color temperatures, a color temperature associated with the lighting properties.

14. The system of claim 1, wherein the processors being operable when executing instructions to determine illumination fields and lighting properties are further operable when executing instructions to:
  determine, based on a time of day, a color temperature associated with the lighting properties.

15. The system of claim 14, wherein the processors being operable when executing instructions to determine the color temperature are further operable when executing instructions to:
  decrease the color temperature when a time at a location of the vehicle transitions from daytime to nighttime; or
  increase the color temperature when the time at the location of the vehicle transitions from nighttime to daytime.

16. The system of claim 15, wherein the processors being operable when executing instructions to determine the color temperature are further based on ambient lighting conditions captured by a sensor of the vehicle.

17. The system of claim 1, wherein the processors are further operable when executing instructions to:
  receive, by the one or more sensors, signals from a second mobile device associated with a second user and wirelessly connected to the vehicle;
  modify the lighting mode based on a second area associated with a second device location; and
  determine, based on the lighting mode and the second device location, illumination fields and lighting properties.

18. The system of claim 1, wherein the processors are further operable when executing instructions to:
  display, by the one or more lights, an image, a video, or an interactive game.

19. A method for configuring an illumination associated with a vehicle, the method comprising:
  receiving, by a control module of the vehicle and by one or more sensors of the vehicle, signals from a mobile device associated with a user and wirelessly connected to the vehicle;
  identifying, by the control module, a lighting mode for illuminating an area associated with a device location;
  determining, by the control module and based on the lighting mode and the device location, illumination fields and lighting properties; and
  controlling, by the control module, operation of one or more lights of the vehicle in accordance with the illumination fields and the lighting properties.

20. A non-transitory computer-readable medium comprising instructions that, when executed by one or more processors of one or more computing devices, cause the one or more processors to:
  receive, by one or more sensors of a vehicle, signals from a mobile device associated with a user and wirelessly connected to the vehicle;

identify a lighting mode for illuminating an area associated with a device location;
determine, based on the lighting mode and the device location, illumination fields and lighting properties; and
control operation of one or more lights of the vehicle in accordance with the illumination fields and the lighting properties.

\* \* \* \* \*